No. 654,022. Patented July 17, 1900.
H. ROBINSON.
HAT PINNING MACHINE.
(Application filed Oct. 12, 1899.)
(No Model.) 3 Sheets—Sheet 1.
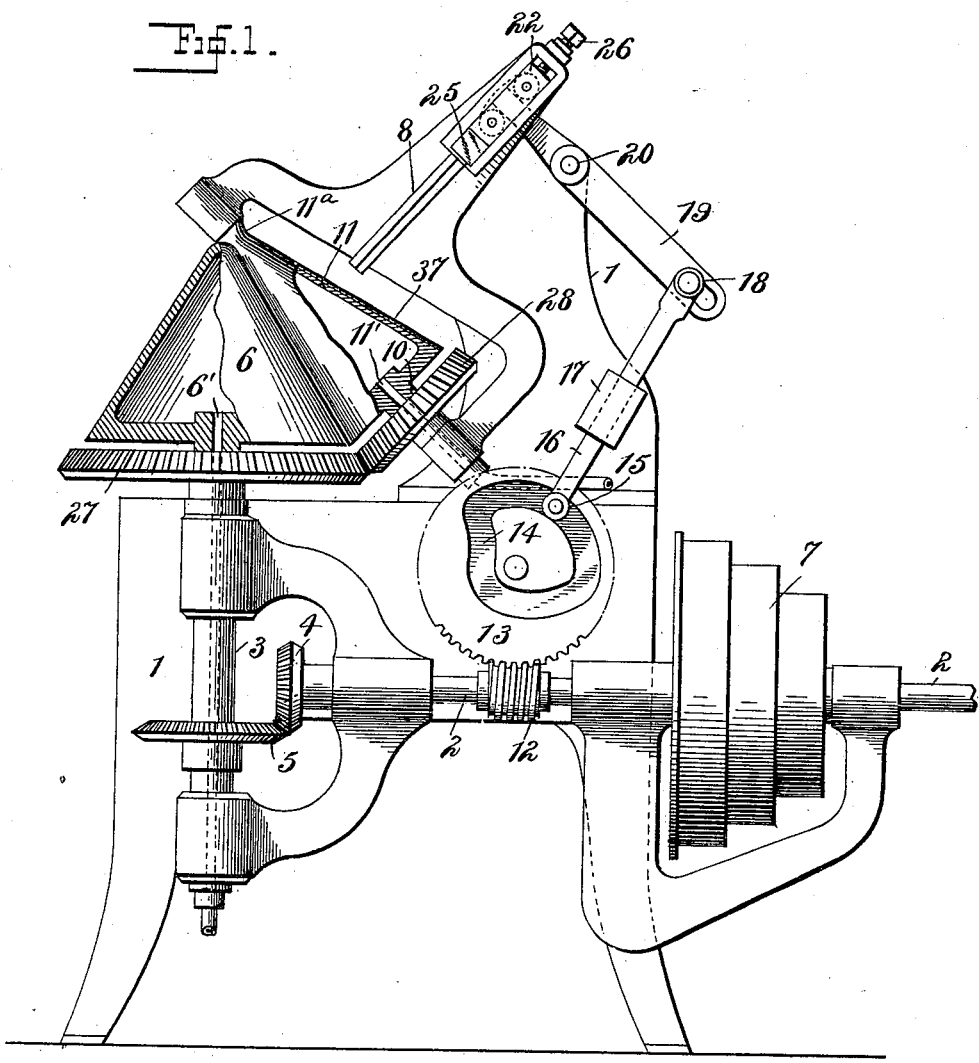

No. 654,022. Patented July 17, 1900.
H. ROBINSON.
HAT PINNING MACHINE.
(Application filed Oct. 12, 1899.)
(No Model.) 3 Sheets—Sheet 2.
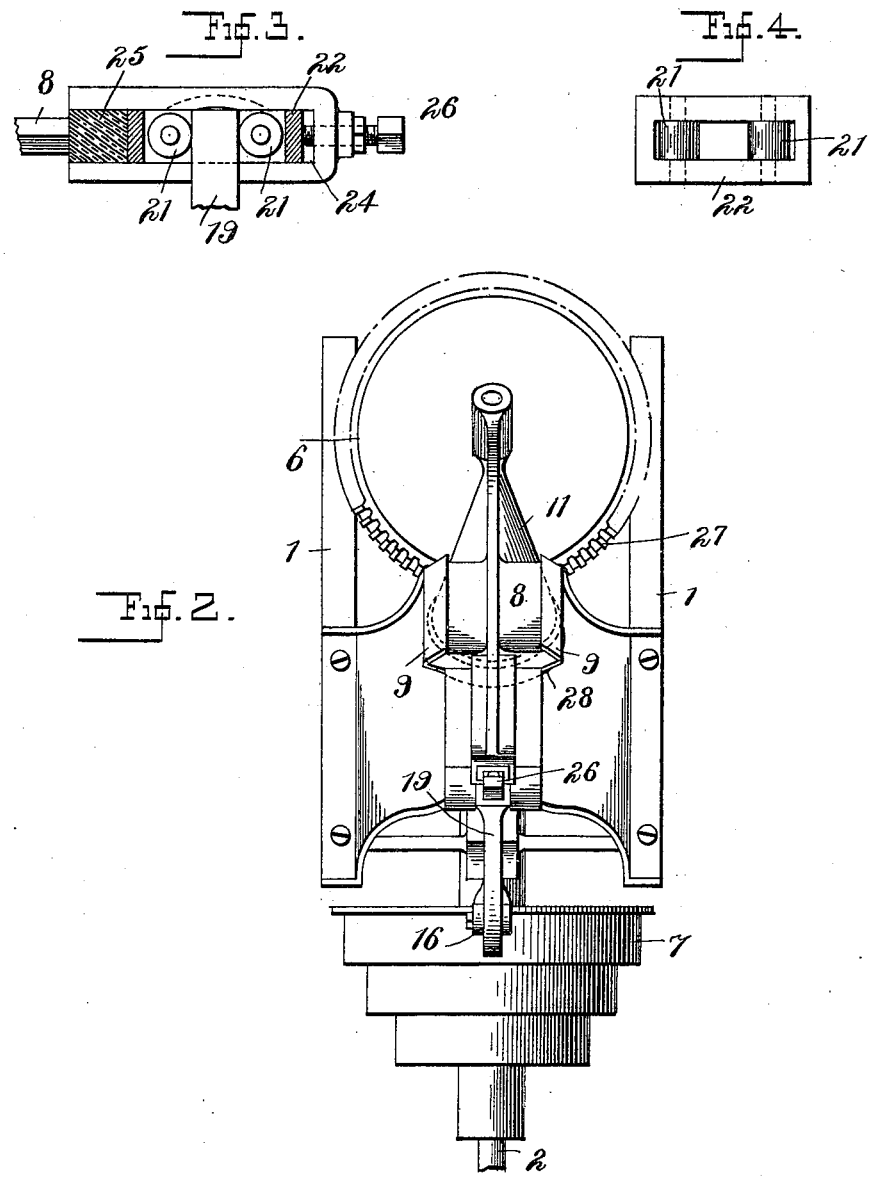
Witnesses.
J. Green
P. F. Smith
Inventor.
Henry Robinson
by Knight Bros
Attys No. 654,022. Patented July 17, 1900.
H. ROBINSON.
HAT PINNING MACHINE.
(Application filed Oct. 12, 1899.)
(No Model.) 3 Sheets—Sheet 3.
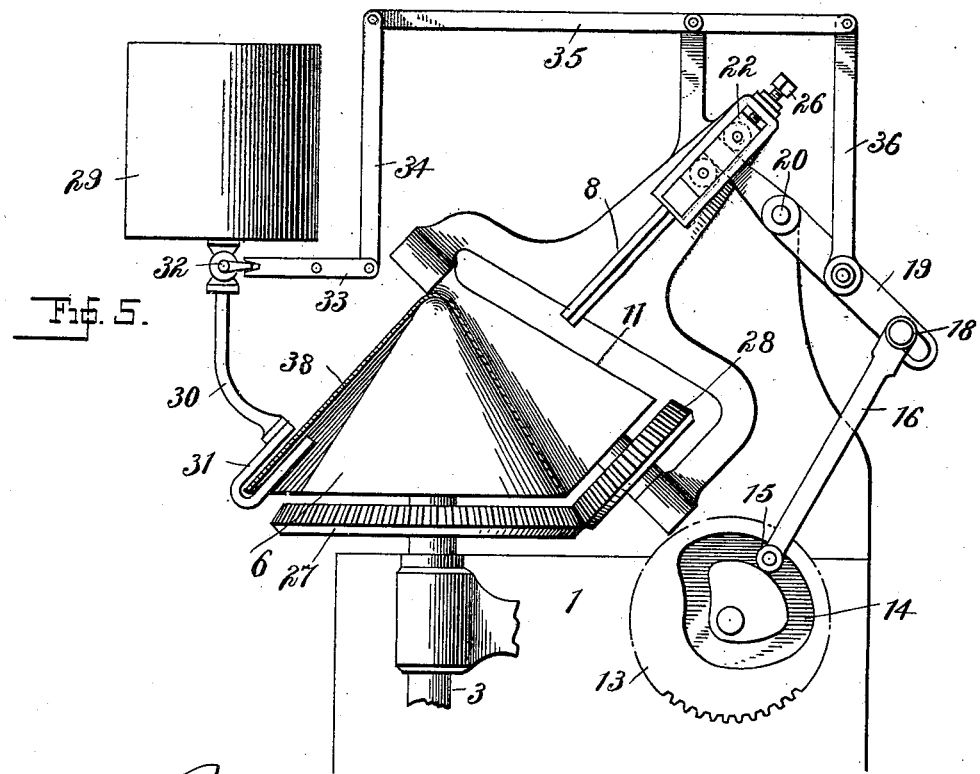
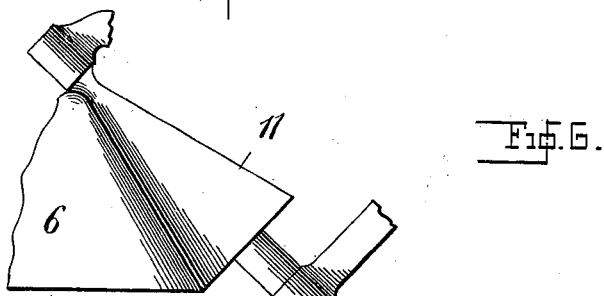
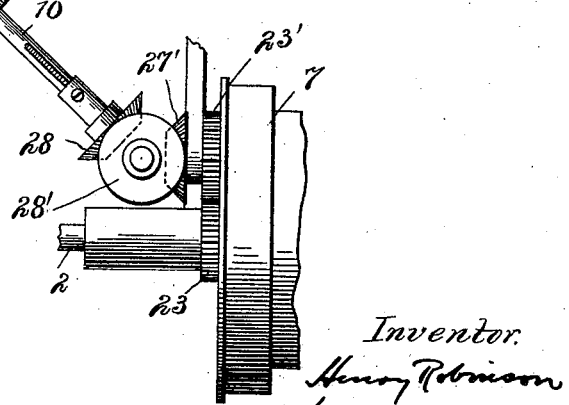
Witnesses.
Inventor.

UNITED STATES PATENT OFFICE.

HENRY ROBINSON, OF NEW YORK, N. Y., ASSIGNOR OF ONE-HALF TO HENRY BERG, OF ORANGE VALLEY, NEW JERSEY.

HAT-PINNING MACHINE.

SPECIFICATION forming part of Letters Patent No. 654,022, dated July 17, 1900.

Application filed October 12, 1899. Serial No. 733,371. (No model.)

*To all whom it may concern:*

Be it known that I, HENRY ROBINSON, a citizen of the United States, residing at New York, in the county and State of New York, have invented certain new and useful Improvements in Hat-Pinning Machines, of which the following is a specification.

This invention relates to improvements in hat-pinning machines, and its object is to provide a machine for pinning hats with the minimum expenditure of time and labor.

Heretofore pinning-machines have been arranged with the hat-body-carrying cones and pressure-cones adapted to be separated by the operation of a hand-lever. The fact that the operator has to attend to the operation of this lever introduces an element of uncertainty into the operation of the machine both as to quality and the quantity of the work turned out. To insure a maximum output as well as effective pinning action on each hat-body, I provide automatically-operated means for periodically withdrawing the pressure-cone from the hat-body-carrying cone, as hereinafter described.

My invention further includes certain other features of construction hereinafter set forth.

In the accompanying drawings, Figure 1 is a partly-sectional view of a machine embodying my invention. Fig. 2 is a plan view thereof. Figs. 3 and 4 are detail views. Fig. 5 shows the adaptation of the machine for use as a brim-stiffener. Fig. 6 shows a modification of the pressure-cam-driving means.

Referring to Figs. 1 and 2, the frame of the machine (indicated at 1) supports in suitable journals a horizontal main driving-shaft 2 and a vertical shaft 3, connected to shaft 2 by bevel-wheels 4 5 and carrying the cone or drum 6, upon which the hat-body is placed. Step cone-driving pulleys 7 on shaft 2 are driven by suitable belt connection, so as to cause the drum or cone 6 to rotate at a suitable speed.

In the upper part of frame 1 is mounted a slide 8, which travels in obliquely-directed V-grooves 9 in the frame, so as to be capable of movement toward and away from the drum 6. Mounted to turn in journal-bearings on this slide is a shaft 10, carrying a cone or drum 11, whose periphery is adapted to contact with the periphery of cone 6 from end to end of same. As shown, the cone 6 is rounded at the tip, and the cone 11 has a projecting or flaring portion $11^a$, which conforms to this rounded tip. Both drums 6 and 11 are hollow and each has a bore 6' or 11' through its shaft through which steam may be supplied to the interior of the drum or cone to maintain same at the temperature best adapted to the pinning operation.

The slide 8 is moved automatically by the following instrumentalities: A worm 12, fast on shaft 2, engages with a worm-wheel 13, having in its side a cam-groove 14, in which engages a roller 15 on the end of a bar 16, which slides in a guide 17 on the frame. The other end of the bar is connected by a pin-and-slot connection 18 to one end of a lever 19, pivoted on a rock-shaft 20 and connected at its other end to the slide 8. I prefer to make this connection to some extent adjustable and yielding. Thus the lever 19 is shown as engaging between rolls 21 in a sliding box 22, which runs in guide-slot 24 in the slide 8, and a rubber cushion 25 is interposed between this box and the lower end of the slot, the box being held down on this cushion by an adjusting-screw 26. This not only permits of a slight adjustment, but by reason of the yielding nature of the cushion enables the pressure-roll to adapt itself to some extent to the inequalities and variations of the hat-body. For the same reason I prefer to provide each of the cones 6 11, or at least the cone 11, with an outer sheath or cushion layer of rubber or other yielding material 37.

Means are provided for rotating the cones 6 and 11 at equal peripheral speeds. In Figs. 1 and 2 such means are shown as consisting of a bevel-gear 27 on the shaft of cone 6 and a bevel-gear 28 on the shaft of cone 11, which engage with one another when the cones are approximated, the teeth of the gears being preferably pointed to insure ready engagement. In place of such bevel-gears bevel-cones, preferably rubber and leather-faced, may be used, or, as shown in Fig. 6, the cone 11 may be driven by bevel-wheel connection 27 28 28' and pinions 23 23' from the main shaft 2.

The shape of the cam-groove 14 is such that the pressure roll or cone 11 is moved toward the drum or cone 6 in a gradual manner, then maintained in such approximated position for a definite time, and then quickly withdrawn and held away for a sufficient time to enable the operator to take off the pinned hat-body and replace it with a fresh one. The operation of this, therefore, is as follows: As soon as the cam 14 removes the cone 11 from the cone 6 the operator takes off the hat-body from the latter cone and replaces it by an unpinned hat-body. The cam then presses the cone 11 gradually against the hat-body and then holds it stationary in pressing position for awhile until the hat-body-carrying cone 6 has made a number of revolutions sufficient to complete the pinning operation, when the cam quickly withdraws the pressure-cone, enabling the workman to replace the pinned hat-body with another one. This operation takes place repeatedly at a rate corresponding to the adeptness of the workman. A more skilled workman will use the high-speed part of the cone-pulley, so as to give a greater number of operations in a given time, and it will be noted that as the driving-gear for the drum supporting the hat-body and the means for separating and approaching the cones are both operated from the same driving-shaft the rapidity of the pinning operation, which depends on the speed of cone 6, is increased in proportion as the time allowed for same is decreased.

The principle of operation above described is especially applicable to brim-stiffening, such an application being illustrated in Fig. 5, wherein the cones and their supporting and driving devices are numbered as in Figs. 1 and 2, supplementary means being provided for supplying varnish, size, or stiffening material to the hat-brim during the times when the cones 6 11 are approximated and in operation. Such means comprise a tank 29 for containing the solution or stiffening liquid used and a pipe connection 30 from said tank to a nozzle 31, which is located in a position to supply the liquid to the hat-brim when it is in position on the cone 6, said nozzle being preferably U-formed, so as to embrace the hat-brim and distribute the stiffening material on each side of same. This nozzle is preferably located comparatively near the pressure-cone, but is here shown as on the opposite side for the sake of clearness. A cock 32 in the pipe connection 30 is controlled by lever-and-link connections 33 34 35 36 from the lever 19, or otherwise connected so as to be operated in unison with the cone 11, so that the stiffening material is only ejected when the cones are approached, at which time the hat-body is assumed to be in place on the cone 6, as represented at 38.

If it is desired to stiffen the entire hat-body, the nozzle 31 is extended accordingly.

The direction of movement of slide 8 is at right angles to the axis of the pressure-roll, so that the latter is moved against the hat-body in the most advantageous manner. This is particularly desirable, in that it brings a downward pressure on the brim of the hat by means of the flaring tip of the pressure-roll. As regards this as well as various other features of my invention it is immaterial whether the pressure be applied automatically or by a treadle-lever, and such treadle operation may therefore be regarded as within my invention in that respect.

Having thus described my invention, what I claim as new therein, and desire to secure by Letters Patent, is—

1. In a hat pinning or stiffening machine, the combination with the supporting-drum for holding the hat-body, of a pressure-drum, means for rotating the supporting-drum, and means, mechanically connected to such rotating means, for automatically approximating and separating the drums.

2. In a hat-pinning machine, the combination with the supporting-drum for holding the hat-body, of a pressure-drum, means for rotating both of said drums at the same peripheral speed, and means, mechanically connected to such rotating means, for automatically approximating and separating the drums.

3. In a hat-pinning machine, the combination with the supporting-drum for carrying the hat, of a pressure-drum, movable to and from the supporting-drum, gears on the respective drums which engage when the drums are approached to one another, a driving-shaft, gearing connecting said shaft with the supporting-drum, a cam connected to and driven by the said shaft and means operated by said cam to move the pressure-drum toward and away from the supporting-drum.

4. The combination with the hat-body-supporting drum, the pressure-drum, movable to and from the supporting-drum, and means for rotating said drums, of means for the supply of stiffening material to the hat-body, a cock controlling such supply, and cam mechanism connected to the drum-rotating means, to the pressure-drum and to the said cock for causing the pressure-drum to approach and separate from the supporting-drum, and simultaneously admit and cut off the supply of stiffening material.

5. In a pinning-machine the combination of the supporting-drum for holding the hat-body, the pressure-drum, and means for causing said drums to approach one another, one of said drums being provided with a yielding covering.

HENRY ROBINSON.

Witnesses:
A. P. KNIGHT,
J. GREEN.